May 8, 1962 T. THEODORSEN 3,032,976
SHOCK WAVE CONTROL MECHANISM
Filed Nov. 15, 1957 6 Sheets-Sheet 1

INVENTOR.
THEODORE THEODORSEN
BY John J. Sullivan
ATTORNEY.

May 8, 1962 T. THEODORSEN 3,032,976
SHOCK WAVE CONTROL MECHANISM
Filed Nov. 15, 1957 6 Sheets-Sheet 2

INVENTOR.
THEODORE THEODORSEN
BY John J. Sullivan
ATTORNEY

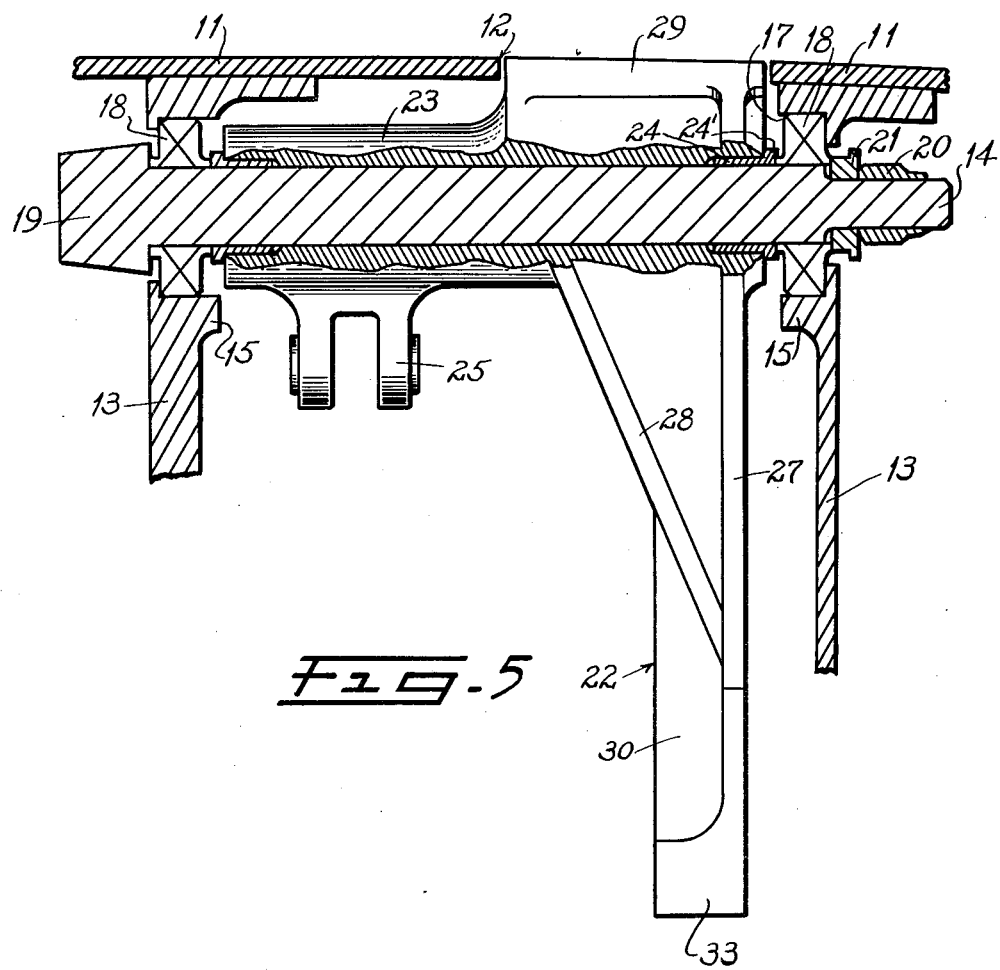

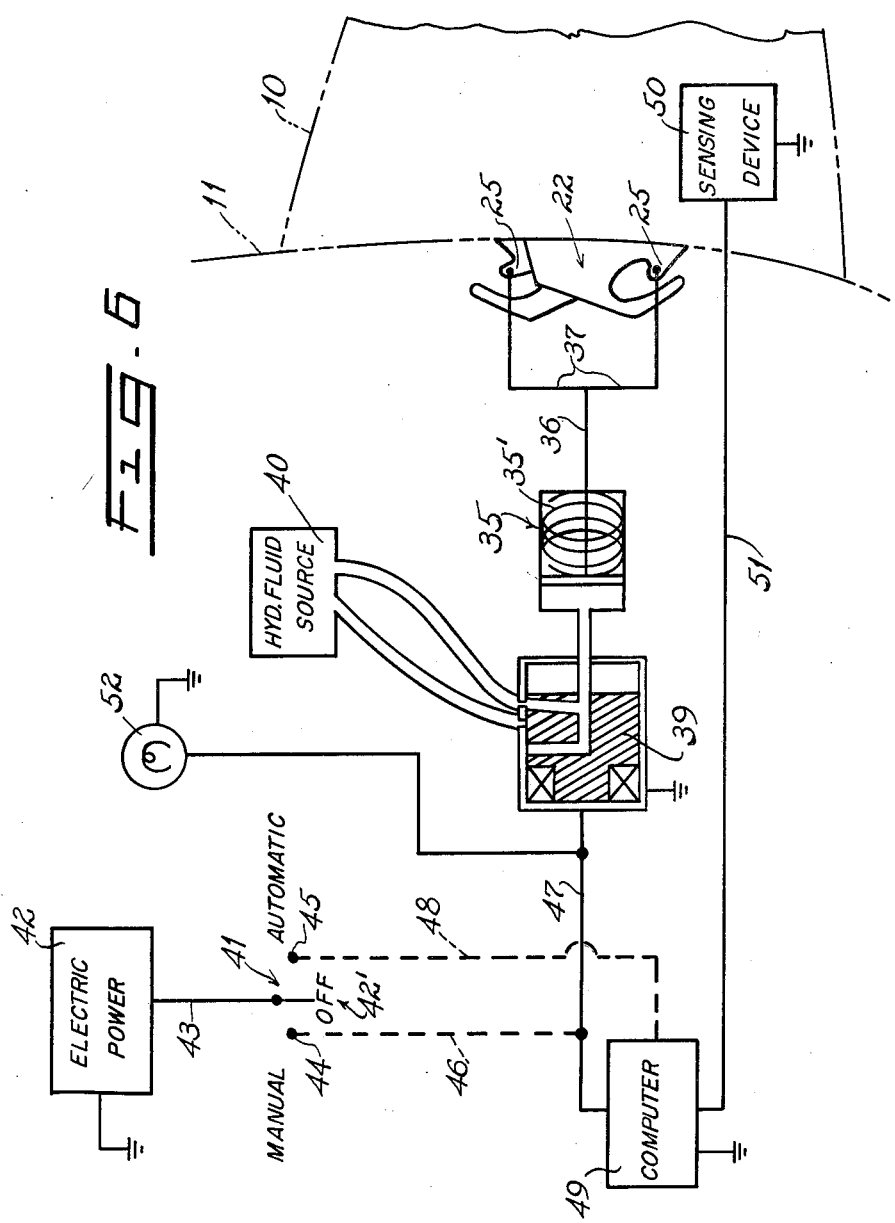

United States Patent Office 3,032,976
Patented May 8, 1962

3,032,976
SHOCK WAVE CONTROL MECHANISM
Theodore Theodorsen, Huntington, N.Y., assignor to Republic Aviation Corporation, Farmingdale, N.Y., a corporation of Delaware
Filed Nov. 15, 1957, Ser. No. 696,683
3 Claims. (Cl. 60—35.6)

This invention relates generally to means for controlling air flow and more particularly to a control mechanism to locate and stabilize a pulsating shock wave within an airstream in a predetermined substantially fixed position.

The present invention contemplates a control mechanism or device associated with a duct or conduit to constantly sense the actions of an airstream therein and to respond to conditions indicating the development of a pulsating shock wave to the end that predetermined or specified adverse and objectionable action thereby may be overcome.

While the instant invention is designed and adapted for use generally to control and stabilize a pulsating shock wave, it finds particular utility in connection with the air inlet duct of a jet airplane. In these airplanes, the inlet ducts are usually designed to accommodate and supply to their respective engines quantities of air corresponding to the requirements of the particular engine during flight conditions for which the airplane is designed. Thus, ducts having various internal contours as well as supplemental devices to be disposed within the duct have been developed for the adjustment and variation of the cross-sectional area and throat location of these ducts.

It has been learned, however, that the above prior designs and devices are, of necessity, limited in operation to only a select range of operating conditions of the airplane. Outside of the selected range, these known designs and devices are incapable of an adequate and proper response and/or adjustment. In an effort to obtain maximum efficiency of the engine over a wider range of operating conditions of the airplane, ducts and their supplemental adjusting devices have been designed for substantially full-time operation. Invariably these full-time devices result in losses in the operational performance of the engine during specific flight conditions, particularly the smoothness of transition of the engine through the various necessary flight regimes.

Moreover, the sensitivity of these supplemental adjusting devices becomes critical to the successful flight of the airplane. If, for any reason, their operation or the operation of associated devices upon which they depend becomes faulty or fails completely, erratic transitions of the engine from one flight regime to the next occur.

By way of example, if, for any reason, the engine should become inoperative or be throttled back suddenly to a speed below that corresponding to the operating range established for the duct while the airplane is moving at supersonic speed, air passing through the inlet duct will exceed the amount of air the inoperative or low-speed engine can absorb. At this instant, this air builds or piles up and becomes compressed forward of the engine. Continued compression of the air forces or moves the shock wave further forward and eventually out of the duct.

Depending upon the specific speed and design of the throttled or inoperative engine including the duct design, the location of the shock wave will stop at a corresponding point with reference to the duct. When the engine then requires or is capable of absorbing more air, it will draw or suck in a limited amount moving the shock wave accordingly. Thus, a pulsating shock wave is created and generated which gives rise to sympathetic oscillation, vibration, etc., of associated or adjacent components of the airplane and engine which can and does result in structural fatigue of such components with a consequent failure thereof.

It is to the solution of the above type of problem that the present invention is directed. Stated differently, this invention, among other things, proposes control means for installation in and adjacent to the inlet duct which merely stands by during the expected or normal operation of the engine. Upon the onset of a pulsating shock wave condition, however, the present control takes over and stabilizes such condition by retaining the shock wave in a pretermined fixed position with reference to the inlet duct.

To the above ends, a device is proposed which includes a projectable or extensible member that is normally retracted to lie flush against and form an aerodynamically clean and smooth continuation of the inlet duct wall or associated structure. Thus, this member normally occupies a position so as not to interfere with or obstruct the passage in the duct.

The device further includes a pick-up or detection unit properly located at a suitable point in the duct which is capable of sensing the onset of a pulsating shock wave. Through suitable connections, the sensing unit controls a power actuator connected to the extensible member for the projection thereof into or transversely of the duct effecting such an interruption in the air flow that compression occurs forward or upstream of the projecting member. A fixed shock wave may thereby be established at or adjacent the entrance to the inlet duct.

When operating conditions change and the engine returns to its normal range of operation, the extensible member is retracted to form a continuation of the inlet duct wall or associated structure as originally.

With the above and other objects in view, as will be apparent, this invention consists in the construction, combination and arrangement of parts all as hereinafter more clearly described and illustrated in the accompanying drawings, wherein:

FIG. 1 is a fragmentary view looking into an air inlet duct of a jet airplane illustrating in elevation a preferred form of extensible member of the present control mechanism associated therewith to show its location with reference to fixed structure of the airplane and disposed in its operative or emergency position projecting transversely of and into the duct, the portion of the airplane surrounding or adjacent the extensible member being illustrated in phantom lines;

FIG. 5 is a transverse section taken through the pivot of one of the components of this extensible member disposed in its normal position to show the details of its rotatable mounting to the fixed structure of the airplane adjacent the duct with portions of the component being illustrated in elevation;

FIG. 6 is a box-diagram of the instant control mechanism to show schematically the circuit connecting the pick-up or sensing unit to the actuating mechanism for the extensible member including means for its automatic or manual operation.

Figure 1:
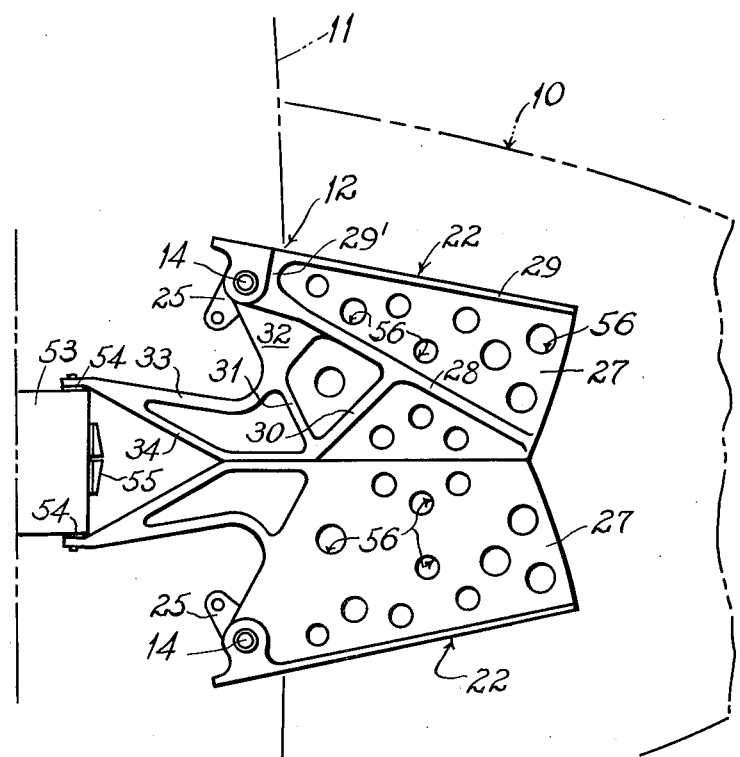
Figure 7:
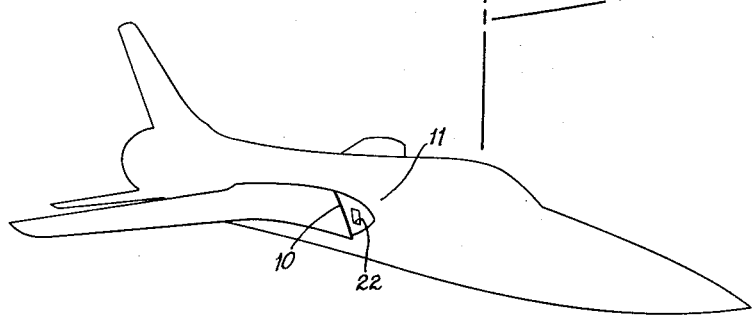
FIG. 7 is a perspective view of an airplane having an air inlet duct to show the location of the present extensible member with reference thereto.

With reference more particularly to the drawings, 10 designates a duct designed and adapted for the passage of supersonic air. Surrounding or adjacent the duct 10 is fixed structure 11 which may be the structure of the duct itself or, as illustrated, structure of an associated member such as, for example, a component of a jet airplane, with which the duct is associated.

The wall of the structure or component 11 which forms the inner surface of the duct 10 is provided with an oblong opening or slot 12 which extends substantially at right angles to the longitudinal centerline of the duct. A fixed mounting plate or bulkhead 13 is located within the component 11 to be disposed one on each longitudinal side of the slot 12 to extend at right angles to and away from the duct 10.

A pair of bolts or shafts 14 pierces each bulkhead 13 adjacent the corresponding edges thereof nearest the slot 12 to be disposed one adjacent each end and transversely of the slot 12 and across the space between the bulkheads 13. To this end, the bulkheads 13 are provided with thickened portions or bosses 15 which are pierced with aligned transverse openings for the passage therethrough of the shafts 14. Such openings are sufficiently oversized as at 17 at their facing ends to accommodate a roller bearing 18 whereby each shaft 14 is mounted for free rotation relative to the bulkhead 13.

At its opposite ends, each shaft or bolt 14 is provided with head and nut means 19 and 20 which are operative in opposition one to the other relative to the bulkheads 13 and associated bearings 18 whereby the shaft 14 is secured against lineal movement. A washer 21 is associated with the nut 20 in the conventional manner.

Mounted on each shaft 14 medially of its length to be disposed between the brackets 13 is an extensible member 22. Each of these members 22 is identical one to the other and comprises an enlarged boss or hub 23 pierced by a transverse hole through which the shaft 14 is designed and adapted to pass. A lock ring or spline 24 connects each end of the hub 23 to the shaft 14 for movement in unison therewith, the opposite ends of the transverse hole in the hub 23 being provided with complemental grooves or spaces to accommodate such rings. Each ring 24 is formed with a flange 24' which projects beyond the end of the hub 23 to abut the adjacent side of the bearing 18. Thus, each member 22 is secured against movement longitudinally on its shaft 14 and the shaft and member is mounted as a unit for rotation in a fixed plane relative to the bulkheads 13.

Adjacent one end of the hub 23 is an arm 25 which projects laterally therefrom and terminates in a bifurcation to receive and pivotally connect actuating means as will be hereinafter explained. At the other end of the hub 23 is a plate 27. This plate 27 is formed or otherwise secured to the hub 23 to be disposed substantially at right angles to and laterally of the shaft 14.

Figure 4:
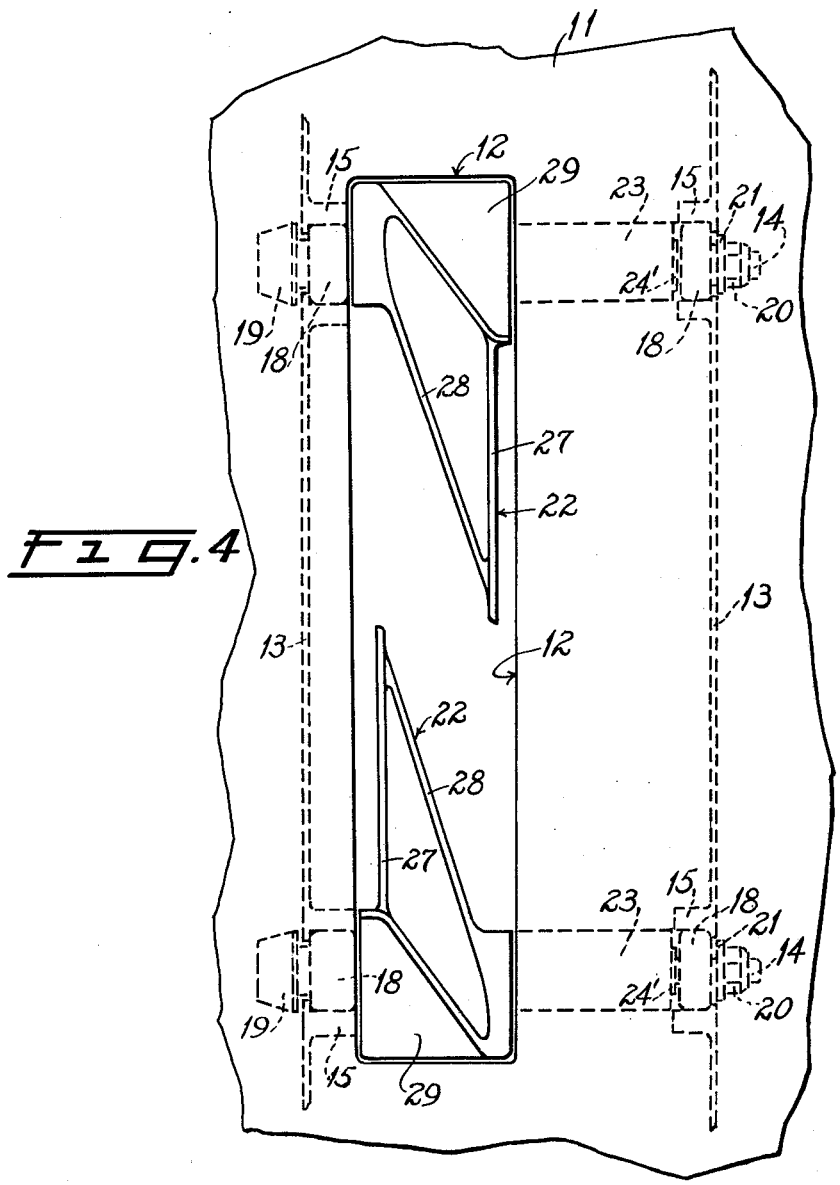
FIG. 4 is a similar view with the extensible member in the operative or emergency position, i.e., corresponding with FIG. 1.

While the shape, size and area of each plate 27 is determined by and dependent upon dimensions of the specific duct with which it is associated, the preferred shape of its main body or effective portion is generally trapezoid, i.e., a quadrilateral of which no two sides are parallel (FIG. 1). The hub 23 is located at the corner of the plate 27 formed by the smallest angle and an integral web or gusset 28 is provided between the hub and adjacent face of the plate to extend diagonally across the plate. The width of this web 28 gradually decreases from the hub outwardly (FIG. 4), its purpose being to increase the structural integrity of the plate 27.

For similar reasons, the longest side of the trapezoid plate 27 is formed with an integral flange 29 which projects therefrom in the same direction as the diagonal web 28. This flange 29 is generally triangular in shape, tapering from its edge disposed adjacent the hub 23 outwardly. At its widest section, the flange 29 is substantially one-half the longitudinal dimension of the hub and substantially equal to the width of the slot 12 in component 11. The edge of this flange 29 nearest the hub 23 is integrally connected to the corresponding edge of the web 28, as at 29'.

Additionally, a relatively short web 30 is integrally formed on the same face of the plate 27 between the diagonal web 28 and the adjacent corner of the plate 27, i.e., extending from web 28 in the direction away from flange 29. At its point of termination, web 30 merges and is integral with a similar web 31 extending in the direction of the hub 23. This web 31 defines a portion of what is herein considered the remaining adjacent side of the corner of the trapezoid plate 27 formed by the smallest angle (the longest side with the flange 29 being the other adjacent side of the corner formed by the smallest angle). At its other end, the web 31 merges with and is integrally connected to a generally triangular web 32 which in turn is similarly connected to the adjacent side of the diagonal web 28 at its root end.

From the foregoing, it is seen that the plate 27 of each extensible member 22 is structurally reinforced by a plurality of thickened portions, viz., webs 28, 30, 31 and 32 and flange 29. Moreover, these thickened portions are closer one to the other or more concentrated adjacent the inner or pivot end of the plate 27 and are so arranged as to rigidly support or strengthen the plate against all deflection. Thus, it is within the purview of this invention to produce a plate having maximum strength-to-weight ratio.

Integrally projecting from the plate 27 and more specifically from the opposed ends of the web 31, is a pair of arms 33 and 34. Each of these arms 33 and 34 is generally rectangular in section and considerably thicker than the plate 27. One side of each arm 33 and 34 forms a flush continuation of the flat or smooth face of the plate 27, while the other side thereof projects beyond the reinforced face of said plate.

At their outer ends, the arms 33 and 34 carried by each member 22 converge and are integrally joined one to the other. A relatively light and structurally strong extension is thereby created on each member 22, the purpose, function and operation of which will become more apparent with the subsequent disclosure.

Figure 2:
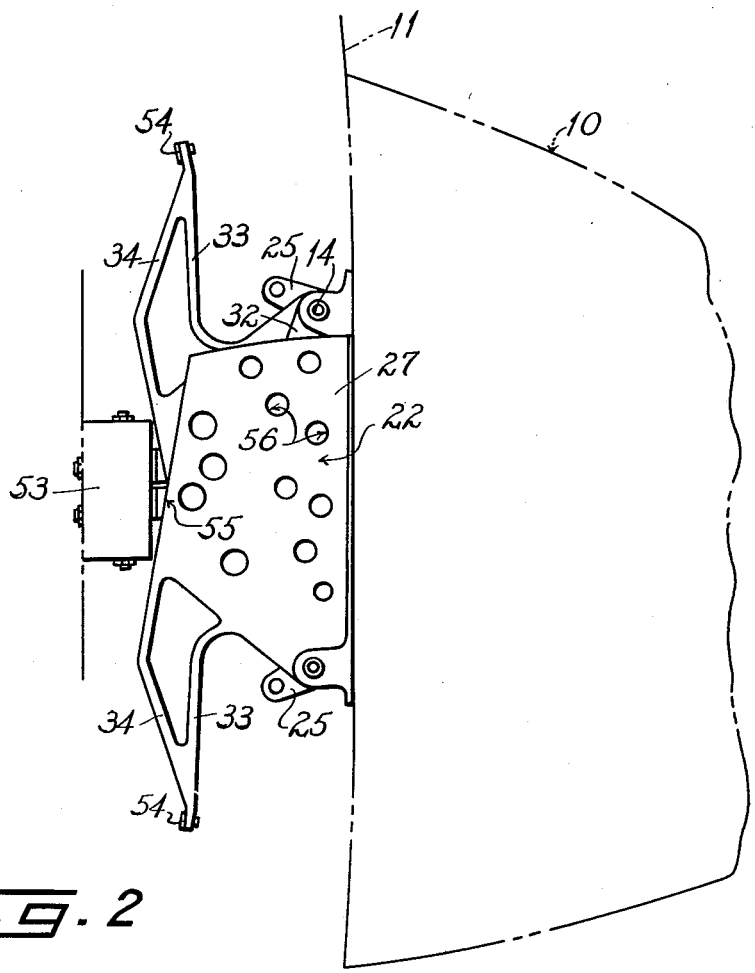
FIG. 2 is a similar view with the extensible member disposed in its normal or inoperative position within the portion of the airplane adjacent the duct to show the edge of the member forming a flush continuation of the wall of the duct.
Figure 3:
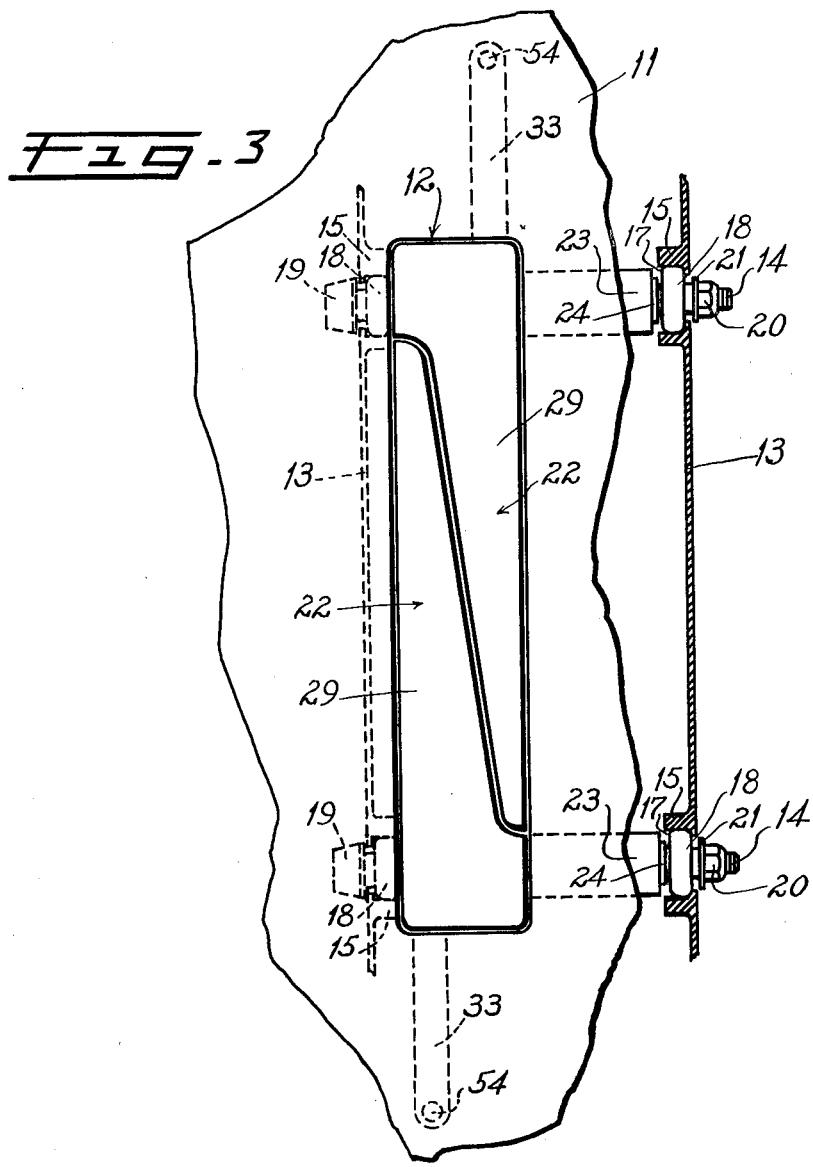
FIG. 3 is a side elevation of the extensible member taken from the right of FIG. 2 to show the components thereof, their mating cooperation when disposed in the normal position and the means by which they are fixedly mounted on the airplane for rotation to and from the projected and retracted positions relative to the duct.

As previously stated the extensible members 22 are identical one to the other. However, these members 22 are mounted on their respective shafts in opposition to each other, i.e., with the arms 25, extensions 33, 34 and plates 27 thereof projecting from corresponding ends of their respective shafts 14 relative to the bulkheads 13 and slot 12 in the component 11. Thus, the webs 28, 30, 31 and 32 and flanges 29 project from their respective plates 27 toward each other with the flanges 29 lying in a common plane when the members 22 are disposed in the normal position (FIGS. 2 and 3). When so disposed, the flanges matingly coact one with the other to fill and close the slot 12 with the outer surfaces of said flanges forming a smooth or aerodynamically clean continuation of the external surface of the component 11.

In addition, the arms 25 of each member 22 are angularly disposed with reference to each other projecting at all times inwardly of the component 11. This facilitates the connection thereto of actuating mechanism located totally within the component 11 and by and through which the extensible members 22 are to be operated.

The actuating mechanism contemplated herein is a power device 35, preferably a hydraulic cylinder, the connecting rod 36 of which is held in or biased to the retracted position, i.e., the shortest length, by mechanical means 35' within the cylinders. At its other end, the rod 36 is connected to the arms 25 of the extensible members 22 through suitable, conventional linkage 37. Thus, the connection of the cylinder 35 to the members 22 is such that the members 22 are normally retained in position within the component 11 (FIGS. 2, 3 and 6). Upon actuation or extension of said cylinder 35, however, against the action of means 35', members 22 are concurrently rotated on their respective pivots or shafts 14 whereby the plates 27 are moved outwardly of the component 11 into a position transversely of the duct 11 (FIG. 1).

When disposed in the protracted or emergency position, the plates 27 combine to partially obstruct or restrict the passage in the duct 10. On the other hand, when the plates 27 are disposed in the retracted or normal position, the flanges 29 thereof coact to fill and close the slot 12 to thereby form a smooth and uninterrupted continuation of the outer wall or surface of component 11. In this position, the members 22 are totally within the component 11 and the passage of the duct 10 is completely unobstructed.

Operation of the cylinder 35 is controlled by an electrically actuated hydraulic valve or solenoid 39 which permits operating fluid under relatively high pressure from a suitable store or source 40 to act on one side of the cylinder 35 in opposition to means 35'. The connecting rod 36 is thereby projected or extended and the extensible members 22 are instantaneously and forcibly ejected to the emergency position. The electrical circuit provided for the actuation of the valve 39 is capable of both automatic and manual operation at the selection of the pilot or technician. To this end, a control switch 41 is mounted in the cockpit of the ariplane or at a similarly convenient location. A source of electric power 42 is electrically connected to the switch 41, as at 43.

The switch 41 includes a pair of individual contacts 44 and 45 and an intermediate off-position 42' between these contacts. The off-position 42' of the switch merely serves to break the circuit between the power source 42 and the solenoid 39 whereby the cylinder 35 is maintained in its normal position under the action of means 35'.

Contacts 44 and 45 on the other hand are each connected to the solenoid 39, contact 44 being directly connected thereto through a conductor or lead 46 connected to a conductor or lead 47 from the solenoid 39 and contact 45 being connected thereto through a lead 48 and a computer or transducer 49. At one of its ends, the computer 49 is connected to the lead 47 from the solenoid 39 and at its other end, to a pressure-sensing device 50 through suitable means 51.

Thus, when the pilot or operator moves switch 41 from the off-position 42' to engage contact 44, the circuit between the power source 42 and solenoid 39 is established through the leads 43, 46 and 47. Solenoid 39 is thereby actuated and communication is established between the fluid source 40 and cylinder 35 for the operation there of against the action of means 35'. This moves the extensible members 22 to their emergency position outwardly of the component 11 and constitutes the manual operation of the device.

The automatic operation of the device is accomplished by the pilot or operator when the switch 41 engages contact 45. In this case, a circuit is established between the power source 42 and solenoid 39 for the same ultimate results as obtained in the manual operation above. However, unlike the manual operation, engagement of the contact 45 by the switch 41 merely arms or energizes the computer 49 with no immediate actuation of the solenoid 39. Such actuation of the solenoid 39 only occurs if and when the computer reacts in response to signals from the sensing device 50.

The sensing device 50 may comprise a pneumatic probe mounted in the duct 10 at a selected position to pick up or sample the airstream passing therethrough. This probe is capable of detecting characteristics of the airstream, such as, for example, pressure fluctuations thereof as indicated by frequency, change of frequency against time, and amplitude and is set at predetermined critical values for such characteristics. So long as these characteristics of the airstream remain below the setting of the probe 50, nothing happens. However, when these characteristics rise above the setting, the probe 50 is excited or triggered whereby this condition is conveyed to the transducer 49 through the connector 51.

It is the function of the transducer or computer 49, when armed by engagement of the contact 45 by the switch 41, to convert the signal received from the probe 50 into an electrical impulse and transmit this impulse to the solenoid 39 for operation of the cylinder 35.

After the cylinder 35 has been extended either manually or automatically as above, and after the conditions prompting this extension have subsided, the cylinder 35 and extensible members 22 may be retracted by returning the switch 41 to the off-position 42'. With the circuit (either manual or automatic) between the power source 42 and solenoid 39 thus broken, the solenoid 39 is deenergized and the cylinder 35 is released to return to its normal position under the action of means 35'. The extensible members 22 are thereby retracted into the component 11 with the flanges 29 of said members again forming a flush continuation of the wall of the duct 10.

If desired or required, suitable signal means may be employed to inform the pilot that the extensible members 22 are disposed in their emergency positions. Such means may comprise a light 52 mounted within the cockpit of the airplane or otherwise visual to the pilot and electrically connected to the lead 47 of the solenoid 39 to indicate when electric power is being delivered through the solenoid 39 for operation of the cylinder 35.

In order to provide instantaneous action of the present emergency device as herein contemplated to the end that the adverse conditions, for which it is designed, may be met as quickly as they appear, fluid under considerable pressure is supplied from the source 40. The force with which the extensible members 22 are projected outwardly of the component 11, therefore, may well have a damaging effect upon subsequent and continued operation of the device. This is particularly true of such parts as the lock ring 24, shaft 14, arm 25 and linkage 37.

To insure against such damage, the invention further provides arresting means to limit the rotation of the extensible members 22 on their respective pivots. This arresting means includes cushioning or snubbing means to further reduce the force of impact occasioned by the sudden arresting of the members during such rotation.

More specifically, a resilient pad or block 53 is fixedly secured to structure within the component 11 to be disposed in the path of rotation of the arms 33—34 of the member 22. If desired, a bumper plate 54 or the like may be secured to the outer or free end of each arm 33—34 for contact with each end of the pad 53. The adjacent face of the pad 53 is shaped or contoured as at 55 to conform to the side of the arms 33—34 at their inner or attached ends. Thus, upon projection of the members 22 outwardly of the component 11, the outer ends of the arms 33—34 strike the opposed ends of the resilient pad 53. When the members 22 are retracted into the component 11, the facing sides of the arms 33—34 abut the contoured face 55 of the pad 53.

When the extensible members 22 are thus disposed in the emergency position (manually or automatically) they partially close and thereby obstruct the air flow within the duct 10. The degree of this obstruction will vary with the particular design of the duct 10, it being sufficient in each case to effectively choke the duct and establish a fixed shock wave forwardly thereof. At the same time some subsonic air is permitted to flow around the members 22 to the end that the engine, if operating, will not be completely choked or killed.

In order to stabilize the flow of air aft of the members 22, i.e., to prevent the air passing or spilling around the edges of the members 22, from becoming turbulent and creating eddys which may prove harmful, a number of perforations 56 are provided in the members 22. The size and number of such perforations will vary in each case depending upon the particular design involved. In addition, these perforations relieve the members 22 of additional loads which otherwise may be imposed as a result of the pressure differential on the opposite sides of the members.

What is claimed is:

1. A control mechanism to locate and stabilize a pulsating shock wave within an airstream in the passage of a duct comprising a pair of coacting, structurally reinforced plates each pierced medially by a plurality of perforations and mounted for rotation in a fixed plane perpendicular to said passage and normally disposed in an inoperative position totally outside of said passage, and an emergency operating mechanism to forcibly and instantaneously eject said plates into an alternative operative position transversely across said passage.

2. A control mechanism to locate and stabilize a pulsating shock wave within an airstream in the passage of a duct comprising a pair of coacting plates each mounted for rotation in a fixed plane perpendicular to said passage and normally disposed in an inoperative position totally outside of said passage, a slot in the wall of the duct common to and adjacent both said plates, a lateral flange projecting from one edge of each plate, said flanges being adapted to align one with the other when the plates are disposed in the inoperative position aforesaid and having an aggregate shape and area when so aligned corresponding to the shape and area of said slot, and an emergency operating mechanism to forcibly and instantaneously eject said plates into an alternative operative position transversely across said passage.

3. A control mechanism to locate and stabilize a pulsating shock wave within an airstream in the passage of a duct comprising a pair of coacting plates each mounted for rotation in a fixed plane perpendicular to said passage and normally disposed in an inoperative position totally outside of said passage, an emergency operating mechanism to forcibly and instantaneously eject said plates into an alternative operative position transversely across said passage, an arm projecting from each plate in a direction away from said passage, and snubbing means carried by stationary structure externally of said passage and disposed in the path of rotation of said arms upon ejection of the plates as aforesaid to cushion the force of impact and arrest said plates in the operative position aforesaid.

References Cited in the file of this patent

UNITED STATES PATENTS

| | | |
|---|---|---|
| 1,595,657 | Halloran | Aug. 10, 1926 |
| 2,551,229 | Alford | May 1, 1951 |
| 2,570,847 | Ovens | Oct. 9, 1951 |
| 2,619,794 | Lombard | Dec. 2, 1952 |
| 2,677,233 | Jordan | May 4, 1954 |
| 2,763,426 | Erwin | Sept. 18, 1956 |
| 2,861,419 | Hausmann | Nov. 25, 1958 |
| 2,876,621 | Bogert et al. | Mar. 10, 1959 |
| 2,906,090 | Morley | Sept. 29, 1959 |

FOREIGN PATENTS

| | | |
|---|---|---|
| 709,300 | Great Britain | May 19, 1954 |